July 12, 1960

W. FLOUR 2,945,162

METHOD AND APPARATUS FOR ASSEMBLING AND
INTERCONNECTING ELECTRONIC APPARATUS

Filed May 28, 1954

Inventor:
William Flour
By Ahlberg, Kupper, en Gradolph
Attorneys July 12, 1960 W. FLOUR 2,945,162
METHOD AND APPARATUS FOR ASSEMBLING AND
INTERCONNECTING ELECTRONIC APPARATUS
Filed May 28, 1954 9 Sheets-Sheet 9

United States Patent Office 2,945,162
Patented July 12, 1960

2,945,162

METHOD AND APPARATUS FOR ASSEMBLING AND INTERCONNECTING ELECTRONIC APPARATUS

William Flour, Chicago, Ill., assignor to Stewart-Warner Corporation, Chicago, Ill., a corporation of Virginia Filed May 28, 1954, Ser. No. 433,106

35 Claims. (Cl. 317—101)

The present invention is directed to a method and means for assembling and electrically interconnecting electrical components in electronic apparatus.

One object of the invention is to improve the operational characteristics of electronic apparatus by the use of novel means for mechanically supporting and interconnecting assemblies of its electrical components.

Another object is to provide improved electrical assemblies in which the normal operating capacities of electronic components are substantially increased through an improved dissipation of heat by structure that can also effect a highly satisfactory electrical shielding of the elements.

Another object is to provide improved electrical assemblies of the above character in which the individual electrical elements, which may be of a conventional construction, are protected from moisture and supported against shock without mechanical strain even to the extent that structurally simplified electrical elements suited for manufacture at considerably less cost than conventional elements can be used with good results in the assemblies.

A further object is to provide improved electrical assemblies of the character recited which are extremely compact.

Still another object is to provide for such electronic apparatus improved pressure contact structure capable of making and maintaining highly efficient, dependable electrical connections between conductors even under adverse climatic conditions.

A more specific object is to provide electrical assemblies of the above character in which easy assembly and quick, accurate replacement of the individual electrical elements is facilitated by separable element supports of novel construction.

An additional object is to provide in electronic apparatus highly compact circuitry which makes available a wide latitude of complex connections between closely spaced electrical elements.

Another object is to provide improved methods of fabricating and assembling electronic apparatus as recited in the previous objects.

A further object is to provide electronic apparatus of the character recited which can be readily checked for operability and conveniently serviced.

Other objects and advantages will become apparent from the following description of the forms of the invention shown in the drawings, in which.

The illustrated form of the invention comprises three subassemblies 10 of electrical elements supported together and interconnected to form a larger assembly 12 of electronic apparatus, which may when necessary be connected with other assemblies and devices to complete the electronic equipment. Ordinarily each subassembly 10 comprises a functional group of elements, such as vacuum tubes, resistors and capacitors, which together will serve as an amplifier, oscillator, power supply or the like.

Figure 1:
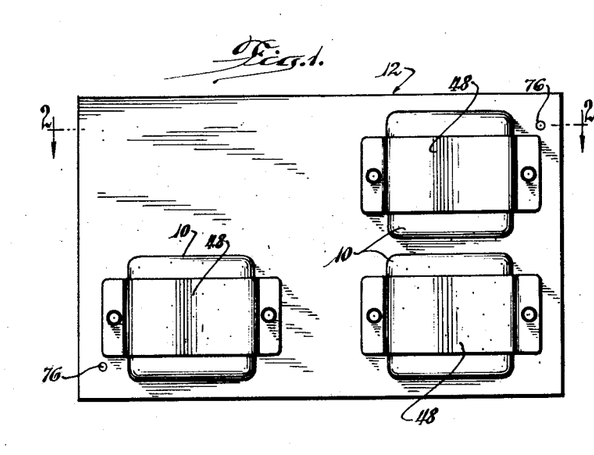
Figure 1 is a rear elevational view of an assembly of electronic apparatus incorporating the invention.
Figures 2, 7, 8:
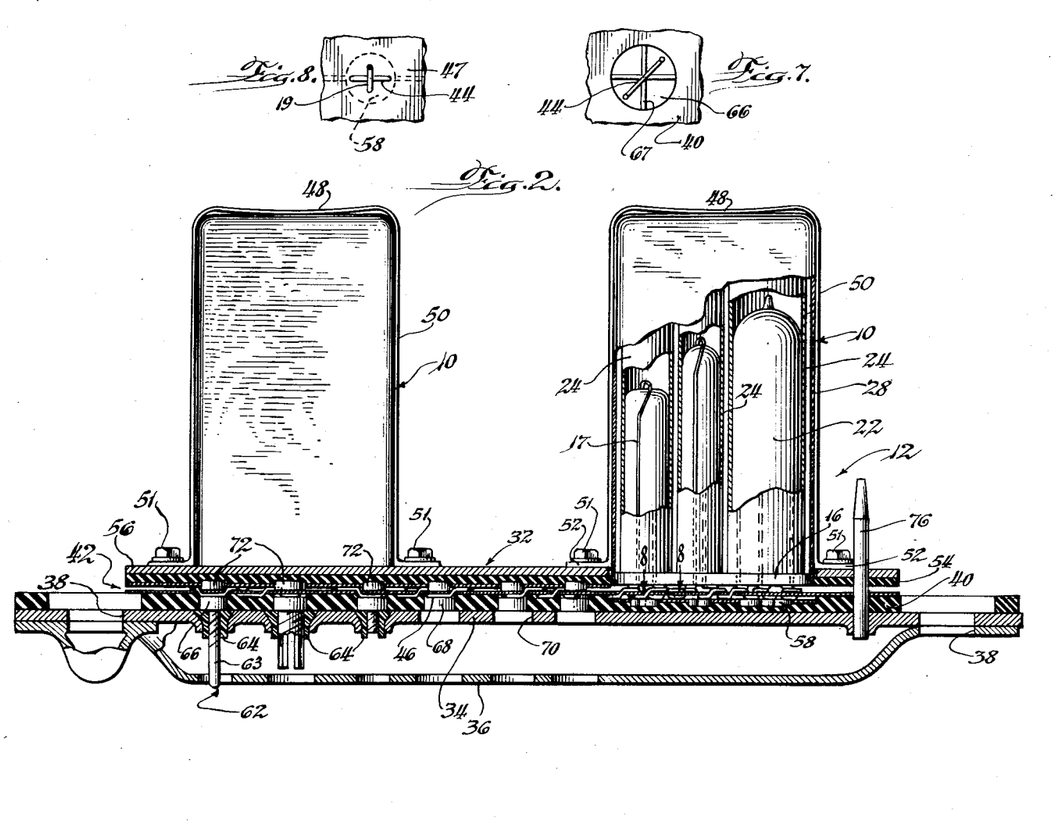
Fig. 2 is a horizontal sectional view taken substantially along line 2—2 of Fig. 1.
Fig. 7 is a fragmentary view on an enlarged scale taken generally along the line 7—7 of Fig. 3 but with the additional showing of a circuit board contact extending across the inner end of a lead-in conductor.
Fig. 8 is a fragmentary sectional view on an enlarged scale taken generally along the line 8—8 of Fig. 2 and showing the crossed relationship of typical coacting contacts.
Figure 3:
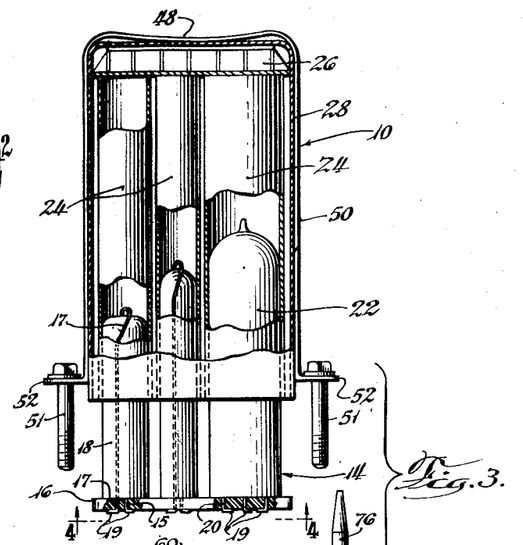
Fig. 3 is a view generally similar to Fig. 2 but showing the components of the assembly in partially exploded relation to each other.
Figure 4:
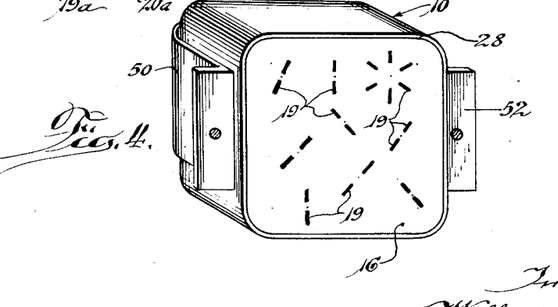
Fig. 4 is a perspective of a subassembly as viewed generally from the line 4—4 of Fig. 3.

As illustrated in Figs. 2 and 3, the electrical elements 14 of each subassembly 10 are clustered on end on one side of a locating board 16. Formed of suitable insulating material, such as alkyd or Bakelite, the locating board 16 should have sufficient thickness to be dimensionally stable in a direction perpendicular to the plane of the board.

The individual electrical elements 14 can be of the same conventional construction used in soldered assemblies. Lead wires 15 and 17 extend from opposite ends of a typical capacitor or resistor 18. The lead wire 15 protruding from the locating board and of the element 18 is inserted through an aperture in the board, cut off and clinched to form a rather short electrical contact 19 on the opposite side of the board. The lead wire 17 protruding from the outer end of the same element is turned down alongside the element and inserted through an aperture in the locating board to form a similar contact 19. The prongs 20 of a conventional vacuum tube 22 can be inserted through apertures in the locating board 16 and bent over to form electrical contacts (also denoted by the numeral 19) for the tube.

The contacts 19, spaced apart from each other, form a pattern on one side of the locating board 16 for engagement with coacting contacts of the larger electrical assembly in a manner to be presently described in detail.

Each electrical element 14 is supported further by an elongated, cylindrical jacket 24. Jackets surrounding electrical elements which generate considerable heat are preferably formed from aluminum or other material having good heat conductivity and also electrical shielding qualities. The jackets 24 are cut to a uniform length to abut against both the locating board 16 and a heat sink 26 of honeycombed metallic construction spaced from the locating board.

A metallic housing 28 open at one end receives the cluster of electrical elements of each subassembly 10. The heat sink 26 of the subassembly bottoms on the closed end of the housing 28 establishing good heat transmitting contact therewith. The heat sink can be made a part of the housing. The open end of the housing is closed by the locating board 16.

Figure 9:
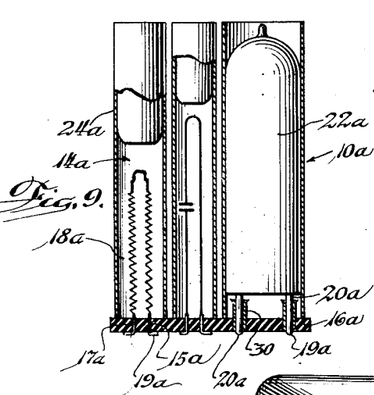
Fig. 9 is a side view of an uncovered subassembly showing modified electrical elements and jackets connected to a locating board.

In large production operations it can be advantageous to use electrical elements 14 of a special, more economical design in the subassemblies 10. As shown in the modified construction of Fig. 9, in which component elements similar to those just described are identified by the same reference numerals with addition of the letter "a," various ones of the electrical elements 14a are formed integrally with their surrounding jackets 24a. Both electrical leads 15a and 17a from a typical resistor 18a protrude from the end of the surrounding jacket 24a that abuts against the locating board 16a. As shown, the locating board 16a is fitted with small sockets 30 which receive the prongs 20a of the vacuum tube 22a. The extreme ends of the prongs protrude slightly through the board 16a to form vacuum tube contacts 19a.

The subassemblies 10 are clamped to generally flat support structure 32 to hold the contacts 19 in engagement with internal circuitry designed to interconnect the electrical elements of the subassemblies with each other and with the overall circuits of the electronic apparatus.

Figure 5:
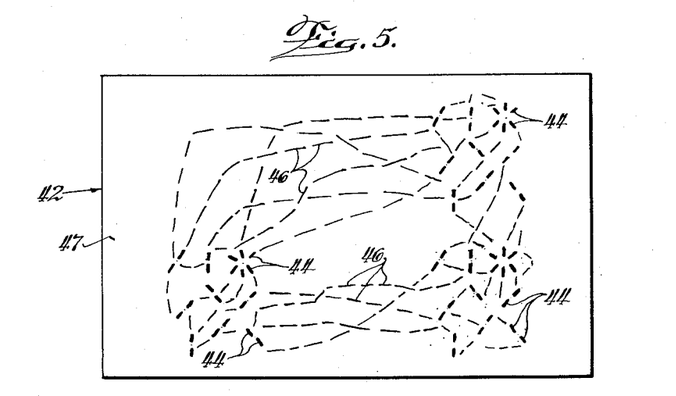
Fig. 5 is a plan view of the circuit board taken along the line 5—5 of Fig. 3.

As shown, the support structure 32 comprises a flat support panel 34 reinforced by suitable bracing means 36 having apertures 38 at opposite sides to receive structure (not shown) normally designed to mount the panel in a vertical position. A layer of rubber or similar material 40 is laid along the upper surface of the support panel 34 (Figs. 2 and 3) to form a resilient support for a generally flat circuit board 42. As shown in Figs. 2, 3 and 5, the circuit board 42 comprises a plurality of contacts 44 arranged in a predetermined pattern and interconnected by various chains or conductors 46. In the present construction both the contacts 44 and the conductors 46 are formed by strands of wire stitched into a bendable sheet of insulating material 47. For clearness in illustration portions of the wires which form the contacts 44 are emphasized in Fig. 5.

The subassemblies 10 are clamped against predetermined portions of the circuit board 42, bringing the electrical contacts 19 of each subassembly into engagement with opposing contacts 44 on the circuit board 42. In the construction shown, spring pressure is exerted on the outer end of each subassembly housing 28 by the inwardly dished central portion 48 of a U-shaped retainer 50 straddling the housing and attached to the support structure 32 by screws 51 extending through two ears 52 on the retainer.

That portion of the circuit board 42 which does not underlie one of the subassemblies 10 is covered by a sheet of rubber or similar material 54 held tightly against the circuit board 42 by an assembly locating board 56. Both the locating board and the sheet 54 are recessed to permit engagement of the various subassemblies 10 with underlying portions of the circuit board. The sheet 54 forms a tight seal with the periphery of each subassembly housing 28.

Figure 6:
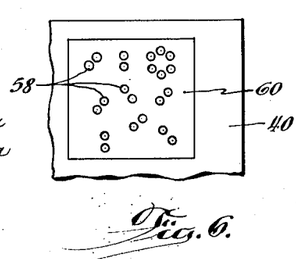
Fig. 6 is a fragmentary plan view taken along the line 6—6 of Fig. 3 and showing supports for a portion of the circuit board contacts.

Firm supports for the individual circuit board contacts 44 opposing the subassembly contacts 19 are provided for by a pattern of small discs 58 mounted on a thin tape or spacer sheet 60 interposed between the contacts and the elastic cushioning layer 40 (see Figs. 2, 3 and 6).

Interconnection of the assembly with a power supply and input and output means to switches and other electrical devices is effected by means of lead-in contacts 62 having shanks 63 extending through insulators 64 seated in the support panel 34. Enlarged heads 66 on the inner ends of the contacts 62 fit into apertures in the elastic back-up layer 40 and define protruding contact crosses 67 (Fig. 7) which make effective connections with opposed circuit board contacts 44.

To facilitate checking of the electrical apparatus, other suitably located conductors 68, similar in shape to the lead-in conductor heads 66, are fitted into the back-up layer 40 to engage other circuit board contacts 44 at critical points in the electrical circuits. Contact with these check point conductors 68 can be made through apertures 70 in the support panel 34.

It will be noted that the crossed relationship between the raised portions 67 of the contacts 66 and 68 and the opposed circuit board contacts 44 assures engagement between these contacts at all times (see Fig. 7). This crossed relationship between coacting contacts is also used to assure effective engagement of the subassembly contacts 19 with the circuit board contacts 44 (see Fig. 8).

Proper support of the circuit board contacts 44 engaging the conductors 62 and 68 is assured by back-up discs 72, similar to the back-up discs 68, mounted on a suitable spacer tape or sheet 74 laid between this portion of the circuit board and the resilient sheet 54. It will be noted that proper location of these various elements relative to each other is facilitated by two or more locating pins 76 fixed in the support panel 34.

Electronic apparatus comprising electrical elements thus assembled and mounted in relative isolation from each other is marked by very worth-while operational advantages. For example, the impedance capacities to ground may be considerably reduced by using very small diameter lead wires from the individual electrical elements. Relieved of the burden of supporting the electrical elements, the lead wires need have only sufficient size to anchor the elements to the locating board and carry the electric currents involved. Wires having a diameter of .016 inch are quite acceptable.

The fact that the location and arrangement of interconnecting conductors between the various electrical elements do not have to be varied to take into consideration the different lengths of the elements permits a very substantial compression in the overall size of the interconnecting circuitry and at the same time assures that the inductances of the various components are practically unchanged by assembly or reassembly.

The side-by-side mounting of the electrical elements 14 eliminates any significant restriction on the creep requirements of the elements even when the lead conductors therefrom are closely spaced at the connections with the circuitry.

Highly efficient cooling of all the electrical elements 14 is afforded by the ability of the metallic support jackets 24 to carry away the heat generated by the elements to a heat sink 26. The heat sink in turn is cooled by the very substantial connection and radiating surface of the metal subassembly housing 28. If desired, liquid cooling can be provided for this housing.

The efficiency with which heat is removed from the various electrical elements 14 permits an intensity of operation of these elements considerably in excess of that of the normal value for the elements.

When fashioned from metal, the support tubes or jackets 24 for the electrical elements 14 provide highly effective electric shielding for all the elements including those which ordinarily would not be shielded because of the difficulties and expense that would be involved.

The side-by-side positioning of the electrical elements 14 on one side of a subassembly locating board 16 makes most efficient use of the space between the locating board and the outer end of the longest element and at the same time removes the elements from the immediate vicinity of their interconnecting circuitry. The resulting arrangement is extremely compact, this compactness being completely compatible with the improved cooling and shielding of the electrical elements as previously described.

Assemblies of this character are well suited for supporting and interconnecting very small electronic elements such as those used in high frequency circuits. The substitution of transistors (not shown) in place of vacuum tubes further reduces the overall size of the assemblies.

The support provided to each electrical element 14 by its surrounding tube 24, which is ordinarily longer than the element, affords excellent protection against shock.

The utility of the electrical assemblies thus provided is enhanced by the fact that standard electrical elements can be used if desired, thus making use of the assemblies practical on a small production basis.

In large production operations, further economies can be relaized from the use of simplified electrical elements in the assembly. When clamped into the larger assembly of apparatus, each subassembly 10 forms an effective seal against moisture for the electrical elements within the subassembly housing. Thus insulated against moisture and supported without mechanical stress, each element 14 need be made only sufficiently strong to provide handling protection, thereby eliminating the need for the usual bulky relatively expensive moistureproofing casing for each element.

The circuit board 42 and the coacting contacts are well protected against moisture by the sealing action of the two resilient layers 40 and 54 under pressure from the subassemblies 10.

Servicing of each subassembly 10 is facilitated by the fact that the electrical elements 14 remain attached to the locating board 16 upon removal of the housing 28 and support tubes 24. This prevents the elements from becoming lost or misplaced. The overall assembly can be easily checked through the contacts 68 and conductors 62 located at critical points on the circuitry of the circuit board 42.

Figures 10, 11, 12, 13, 14, 15:
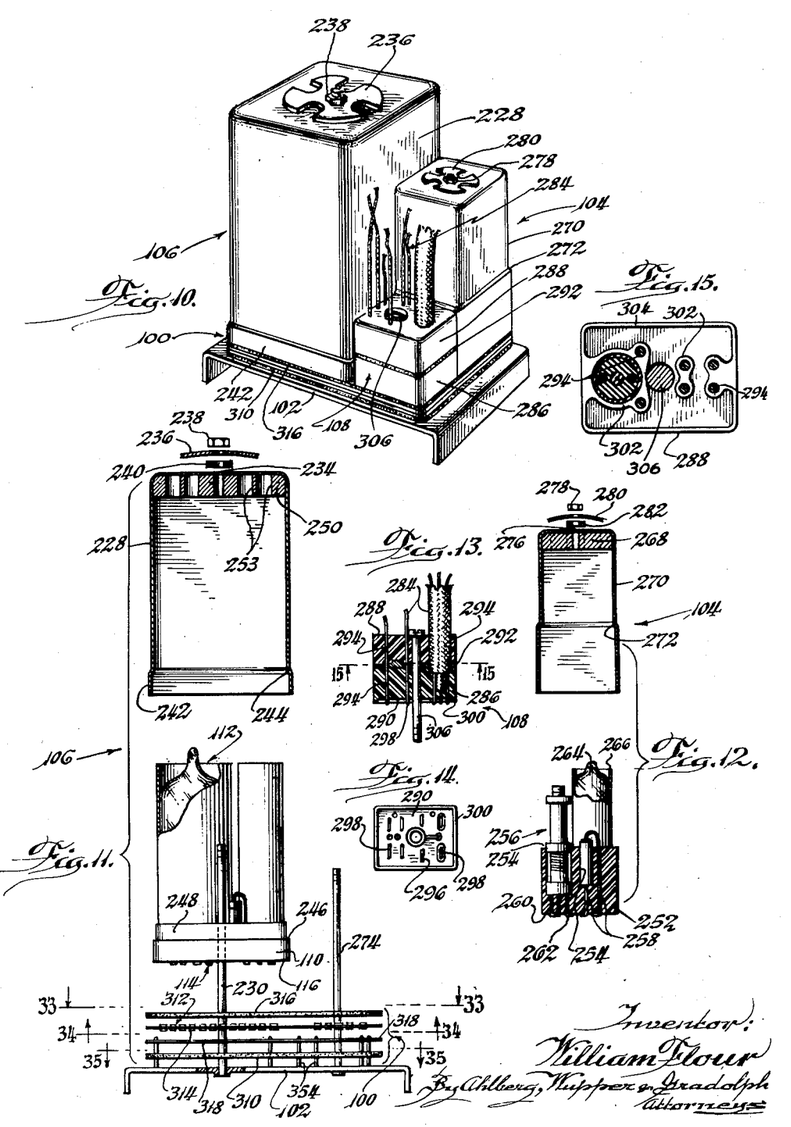
Fig. 10 is a perspective view of an electrical assembly incorporating modifications of the invention.
Fig. 11 is an exploded view of a large portion of the assembly of Fig. 10.
Fig. 12 is an exploded view of a subassembly of Fig. 10.
Fig. 13 is a vertical sectional view of connecting block structure of Fig. 10.
Fig. 14 is a bottom view of Fig. 13.
Fig. 15 is a horizontal sectional view on an enlarged scale taken along the line 15—15 of Fig. 13.

A number of modifications and extensions of the invention are incorporated into the assembly of electronic apparatus shown in Fig. 10. A generally flat layered assembly 100 of circuitry means mounted on a backing plate 102 in Fig. 10 supports and electrically interconnects two subassemblies 104 and 106 of electrical elements and a connecting block 108.

As shown in the exploded view of Fig. 11, the flat locating member 110 of the larger subassembly 106 is thickened to have considerable body. The locating member is socketed to receive the lower ends of a plurality of electrical elements, including vacuum tubes, condensers, and resistors, indicated generaly by the numeral 112, which are connected with a pattern of electrical contacts 114 held generally in the plane of a contact face 116 formed on the lower side of the member.

The structure used to support the electrical elements 112 in the locating member 110 and make connections with the contacts 114 may have a number of different forms, each marked by worth-while features and advantages. For the purpose of illustration, a number of different element supports are incorporated into the subassembly 106 and individually illustrated in Figs. 16 to 32.

Figure 16:
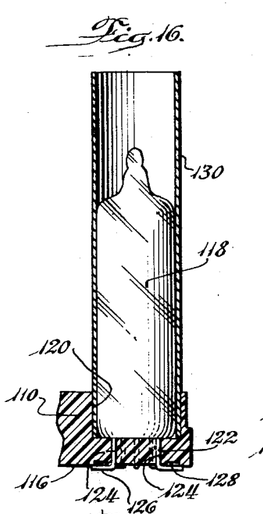
Fig. 16 is a vertical sectional view on an enlarged scale of a modified electrical element support.
Figures 17, 19, 20, 22, 23, 42, 43:
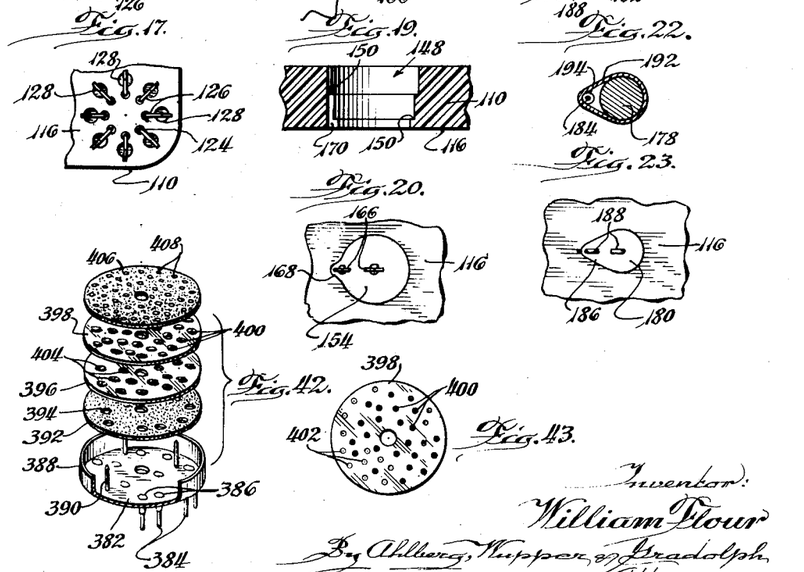
Fig. 17 is a bottom view of Fig. 16.
Fig. 19 is a vertical sectional view of socket means for receiving the support structure of Fig. 18 as shown in phantom in Fig. 18.
Fig. 20 is a bottom view of the socket of Fig. 19 with the support of Fig. 18 inserted.
Fig. 22 is a sectional view taken along the line 22—22 of Fig. 21.
Fig. 23 is a bottom view of Fig. 21.
Fig. 42 is an exploded perspective view of modified circuitry.
Fig. 43 is a plan view of a circuit board of Fig. 42.

Figs. 16 and 17 illustrate the manner in which an elongated electrical element, such as the vacuum tube 118 shown, is supported in a socket 120 extending part way through the locating member 110 from the side opposite the contact face 116. The socket 120, considerably shorter than the vacuum tube 118, is generally perpendicular to the plane of the contact face 116.

A plurality of conductor wires 122 extend from the vacuum tube 118 through apertures 124 in the locating member 110 at the bottom of the socket 120 to the contact face 116. The ends of the conductor wires 122 are bent over into the plane of the contact face 116 to form short cylindrical contacts 126 of rather small diameter. Shallow indentations 128 formed in the contact face 116 in underlying relation to the respective contacts 126 facilitate proper engagement of the latter with coacting contacts in the circuitry means 100, Fig. 17.

A cylindrical metal jacket 130, fitted over the electrical element 118, extends down into the socket 120.

A modification of the electric element support just described is shown in Figs. 26 to 29. In this instance an elongated resistor 132 is inserted into a socket 134 in the locating member 110 extending toward the contact face 116 to a depth less than the thickness of the locating member. A conductor wire 136 from the contact face end of the resistor 132 extends from the bottom of the socket 134 through an aperture 138 to the contact face 116. A second conductor wire 140 connected to the other end of the resistor 132 is turned down alongside the resistor to pass through a groove 142 in the side of the socket 134 and an aperture 144 forming a continuation of the groove to the contact face 116. The two conductor wires 136 and 140 are cut off just beyond the contact face 116 and flattened to form knife-edge shaped contacts 146 facing outwardly from the contact face. The flattened contacts 146 have a width somewhat greater than the diameter of the apertures 138, 144 thus preventing retraction of the contacts through the apertures in the direction of the resistor 132.

Figure 18:
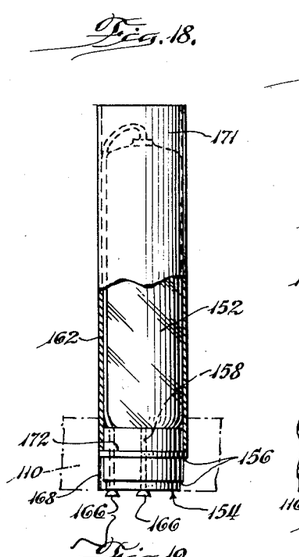
Fig. 18 is a vertical sectional view on an enlarged scale of another modified electrical element support.

Figs. 18 to 20 show another form of electrical support structure in which a socket opening 148 extends all the way through the locating member 110 in generally perpendicular relation to the contact face 116. The socket 148, which is of generally cylindrical shape, is reduced in diameter in two successive steps in passing through the locating member 110 toward the contact face 116, thus forming two internal annular ledges 150 in the socket facing away from the contact face.

An elongated electrical element such as a capacitor 152 is connected in axial alignment with a generally cylindrical insert 154 of insulating material shaped to fit snugly into the socket 148. Thus the end of the insert 154 remote from the capacitor 152 is successively stepped down in diameter to form two shoulders 156 adapted to abut against the socket ledges 150 to locate one extreme end of the insert flush with the contact face 116.

A conductor wire 158 attached to the end of the capacitor 152 adjacent the insert 154 extends through the insert to the contact face end thereof. A longer conductor wire 162 attached to the opposite end of the capacitor 152 is turned down alongside the capacitor and run through the insert 154 to its contact face end. Both conductor wires 158 and 162 are cut off slightly beyond the insert 154 and flattened to form two knife edge shaped contacts 166.

A correct angular positioning of the insert 154 and the contacts 166 in relation to the locating member 110 is assured by a lateral protuberance 168 on the insert which fits into a recess 170 in the side of the socket 148.

The insert 154 is held firmly in the socket 148 by a cylindrical jacket 171 of insulating material slipped over the capacitor 152 and abutting against an outwardly facing shoulder 172 formed on the insert by necking down the end of the insert adjacent the capacitor. The outer end of the jacket 171 is supported in turn by housing structure of the subassembly 106 in a manner to be presently described.

It will be appreciated that when a number of different electrical elements are mounted in a locating member 110 by use of the structure just described, the size and shaping of the sockets 148 and the coacting inserts 154 for the respective elements can be varied to provide positive assurance against errors in assembly or reassembly of the parts. This is of great advantage not only in manufacturing but also in servicing the apparatus in the field.

Figure 21:
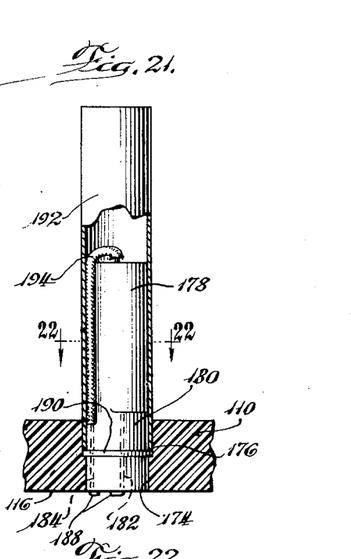
Fig. 21 is a vertical sectional view on an enlarged scale of another modified electrical element support.

A further modification of the electrical element support just described is shown in Figs. 21 to 23. In this form a socket opening 174 extending all the way through the locating member 110 from the contact face 116 has a noncircular transverse shape along its entire length. The end of the socket 174 remote from the contact face is enlarged to form a single internal ledge 176 in the socket.

An elongated resistor 178 is attached at one end to an insert 180 molded around a conductor wire 182 from the adjacent end of the resistor and a second conductor wire 184 extending down one side of the resistor from the opposite end thereof. A protuberance 186 on one side of the insert 180, which is shaped to fit snugly within the socket 174, provides additional body to the insert surrounding the conductor wire 184. Both conductor wires 182, 184 are cut off slightly beyond the insert 180 and shaped to form two knife-edge-like contacts 188.

A peripheral belt 190 molded integrally with the insert 180 abuts against the internal socket ledge 176 to locate the insert 180 substantially flush with the contact face 116. The opposite side of the belt 190 forms an abutment which is engaged by a metal jacket 192 slipped over the resistor 178 and the contact wire 184. Insulation 194 around the wire 184 prevents contact with the metal jacket 192. The jacket has a noncircular transverse shape corresponding to that of the insert 180 and socket 174. Supported at its outer end by housing and heat sink structure in a manner to be presently described, the jacket 192 holds the insert 180 firmly in the socket 174.

Figures 30, 31, 32:
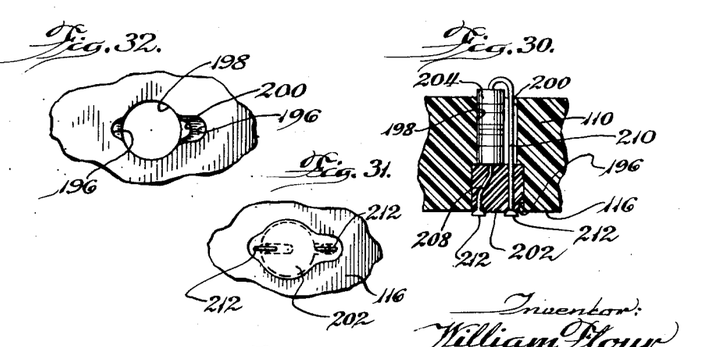
Fig. 30 is a vertical sectional view on an enlarged scale of another modified electrical element support.
Fig. 31 is a bottom view of Fig. 30.
Fig. 32 is a bottom view of Fig. 30 showing the socket structure with the electrical element removed.
Figure 33:
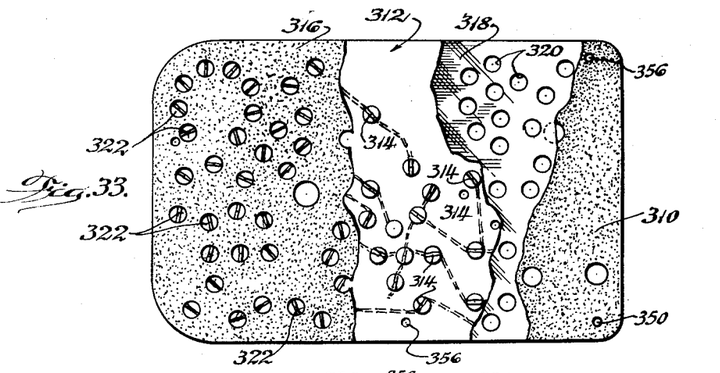
Fig. 33 is a plan view taken along line 33—33 of Fig. 11 and showing successive layers of the underlying structure broken away for clearness of illustration.

A separable electrical element support of a somewhat different type is illustrated in Figs. 30 to 32. As shown, a recess 196 of noncircular shape is formed in the contact face 116 of the locating member 110. A generally cylindrical socket 198 extends from the bottom of the recess 196 into the body of the locating member 110 in generally perpendicular relation to the contact face 116. An axial groove 200 is cut into one side of the socket 198. The recess 196 has sufficient size in the plane of the contact face 116 to extend somewhat beyond opposite sides of the socket 198 and groove 200 (see Fig. 32).

An insert of insulating material 202 is shaped to fit snugly in the socket 198 and lie flush with the contact face 116. An elongated electrical element 204, in this instance a resistor, is mounted on one side of the insert 202 to extend into the socket 198 by two conductor wires 208, 210 extending from opposite ends of the electrical element through the insert. The conductor wire 210 from the outer end of the electrical element 204 extends down alongside the element through the socket groove 200. Both wires 208, 210 are cut off slightly beyond the insert 202 and either bent over or flattened (as shown) to form contacts 212. The contacts 212 are held against movement through the insert 202 in the direction of the electrical element 204 by engagement with the contact face of the insert. The insert 202 is supported on the bottom of the recess 196 which forms a support ledge facing the contact face 116.

Figure 24:
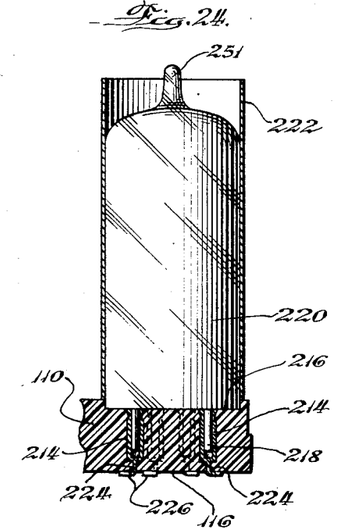
Fig. 24 is a vertical sectional view on an enlarged scale of another modified electrical element support.
Figure 25:
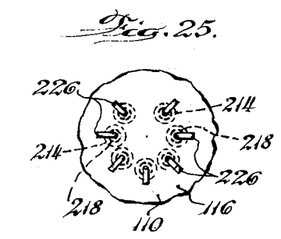
Fig. 25 is a bottom view of Fig. 24.
Figure 26:
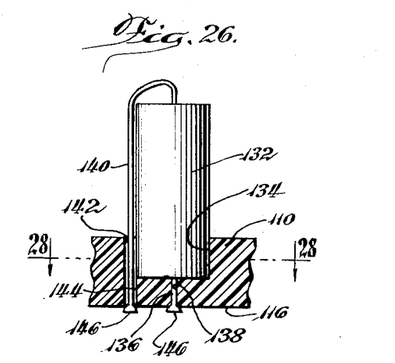
Fig. 26 is a vertical sectional view on an enlarged scale of another modified electrical element support.
Figure 27:
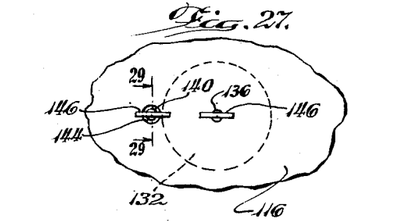
Fig. 27 is a bottom view of Fig. 26.
Figure 28:
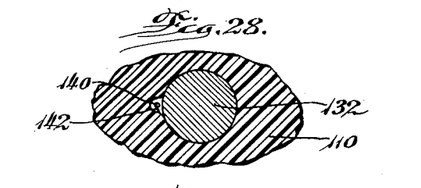
Fig. 28 is a sectional view taken along line 28—28 of Fig. 26.
Figure 29:
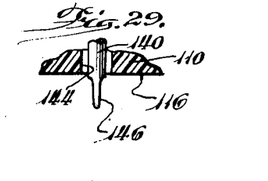
Fig. 29 is a fragmentary sectional view taken along line 29—29 of Fig. 27.

Figures 24 and 25 illustrate the manner in which multiple sockets 214 are embedded in the locating member 110 at the bottom of a recess 216 to receive the connecting prongs 218 at one end of a vacuum tube 220. The tube 220 can be isolated by a cylindrical metal jacket 222 encircling the tube and abutting against the locating member 110. A plurality of conductors 224 extend from the respective sockets 214 through the locating member 110 to the contact face 116 where the conductors are bent over to form an annular pattern of contacts 226. This arrangement permits the tube 220 to be removed and replaced without disturbing the sockets 214 or the contacts 226.

As illustrated in Figs. 10 and 11, a housing 228 for the electrical elements 112 of the subassembly 106 is used to apply force to the locating member 110 to hold the contact face 116 thereon in firm engagement with the circuitry means 100. The generally rectangular housing 228 is open at one end to receive the electrical elements 112 and encircle the locating member 110.

A stanchion 230 anchored to the backing plate 102 passes centrally through the locating member 110 and extends out through an aperture 234 in the closed end of the housing 228. A spring washer 236 and a nut 238 threaded on the free end of the stanchion 230 apply force to the outer end of the housing 228. A small annular seal 240 encircles the stanchion 230 between the washer 236 and housing.

An abutting engagement between the housing 228 and the locating member 110 is obtained by enlarging a narrow portion 242 of the marginal edge of the housing to form a peripheral shoulder 244 facing the open end of the housing. The shoulder 244 engages a narrow ledge 246 formed on the periphery of the locating member 110 in spaced relation to the contact face 116 by inwardly offsetting a peripheral portion 248 of the locating member edge. The housing 228 fits snugly around the periphery of the locating member 110 and extends slightly beyond the contact face 116 to form a tight seal with a compressible member of the circuitry means 100 in a manner to be presently described in greater detail.

As shown in Fig. 11, a generally flat heat sink 250 of substantial thickness is fitted into the closed end of the housing 228 to engage the outer ends of the various jackets 171, 192 and 222 encasing electrical elements mounted on the locating member 110. The support provided for the jackets 171 and 192, for example, maintains the inserts 154 and 180 firmly seated in the locating member 110. A protuberance 251 on the vacuum tube 220, Fig. 24, extends into one of several recesses 253 in the heat sink 250.

It will be appreciated that in practice the number of structural forms used to support electrical elements on the locating board 110 will be reduced to those best suited to the particular service for which a given unit of electronic apparatus is designed.

The construction of the subassembly 104 would ordinarily be generally the same as that of the subassembly 106. However, for the purpose of illustration, certain structural modifications of the invention are incorporated into the subassembly 104. Thus, as shown in Fig. 12, the locating member 252 is thickened considerably to provide deeper sockets 254 for the various resistors, inductances and vacuum tubes (indicated generally by the numeral 256) included in this subassembly. Conductors 258 extend from the electrical elements 256 through the locating member 252 to a generally flat contact face 260 thereon where the conductors are bent over to form electrical contacts 262. The deeper sockets 254 provide a steadier support to the electrical elements 256 without the use of support jackets. However, as shown, a vacuum tube 264 included in the electrical elements 256 is encircled by a metal jacket 266 which engages a heat sink 268 in the closed upper end of a housing 270 which is fitted over the subassembly.

The lower end of the housing 270 embraces the periphery of the locating member 252 and extends slightly beyond the contact face 260 to form a tight seal with elastic sealing structure in the circuitry means 100 in a manner to be further described later.

Just above the locating member 250 the housing 270 is sharply reduced in size to a slight degree to form an inner peripheral shoulder 272 engageable with the peripheral edge of the locating member 252 remote from the contact face 260. The abutting engagement between the housing shoulder 272 and the locating member 252 is used to hold the locating member and the contacts 262 in firm engagement with the circuitry means 100.

A support stanchion 274 fixed to the backing plate 102 extends up through the locating member 252 and the heat sink 268 to protrude out through an aperture 276 in the closed end of the housing 270. A nut 278 threaded on the free end of the stanchion 274 applies force to the housing 270 through a spring washer 280 and a sealing washer 282.

The connecting block 108, shown in Figs. 10 and 13 to 15, is designed to detachably connect a plurality of conductor wires 284 with the circuitry means 100 in generally the same manner used in interconnecting the two subassemblies 104, 106 with the circuitry means. Moreover, the connecting block 108 forms an effective seal between the circuitry means 100 and the individual wires 284.

Structurally, the connecting block 108 is formed by an inner half section 286 and an outer half section 288 separable along a medial plane generally parallel to a contact face 290 formed on one side of the inner half section. Both block sections 286, 288 (particularly the inner section 286) are formed of insulating material. A flat layer 292 of rubber or material of similar resilient qualities is interposed between the two block sections 286, 288.

The conductor wires 284 are inserted through aligned holes 294 in the two block sections 286, 288 and the resilient layer 292. Portions of the wires 284, stripped of insulation, are extended somewhat beyond the contact face 290 and bent over into shallow elongated recesses 296 (Fig. 14) in the contact face to form short contacts 298. The recesses 296 have a depth somewhat less than the thickness of the contacts 298.

A raised bead 300 on the periphery of the contact face 290 is adapted to engage sealing structure on the circuitry means 100 in a manner to be further described later.

A plurality of pressure applying beads 302, formed on the side of the outer block section 288 facing the sealing layer 292, surround the respective holes 294 extending through the block section (see Fig. 15). A raised peripheral bead 304 on the outer block section 248 also faces the sealing layer 292.

The connecting block 108 is held firmly against the circuitry means 100 by a central screw 306 extending through the block and threaded into the backing plate 102. Pressure applied by the screw head to the outer block section 288 presses the beads 302 on this section into the sealing layer 292 causing the material of this layer to flow into tight sealing engagement with the wires 284. The bead 304 forms a tight seal with the periphery of the sealing layer 292.

As shown in Figures 11 and 33 to 35, the circuitry means 100 comprises a rectangular base 310 of rubber or other resilient material supported on the surface of the metal backing plate 102. A circuit board 312 comprising a pattern of interconnected contacts 314 is laid over the resilient base 310 and covered by a flat rectangular sealing layer 316 of rubber or similar material. A thin rectangular wafer 318 of insulating material having a pattern of apertures 320 therein conforming to the pattern of the contacts 314, is laid between the circuit board 312 and the base 310 to serve as an auxiliary locating member for contact structure on the circuit board in a manner to be further described later.

When the subassemblies 104 and 106 and the connecting block 108 are tightened against the circuitry means 100, the electrical contacts thereon engage the underlying circuit board contacts 314 through a pattern of small apertures 322 in the resilient sealing layer 316.

The short extension of the housing 228 beyond the contact face 116 of the subassembly 106 is pressed into the underlying portion of the sealing layer 316 to form a highly efficient seal therewith. At the same time the ring portion of the sealing layer 316 underlying the edge of the housing 228 is pressed against the circuit board 312 to form a tight seal with the circuit board and press the latter tightly against the auxiliary wafer 318. This in turn forms a seal between the circuit board 312 and the wafer and the backing plate 102, sealing the latter together through the resilient base 310.

In this manner an effective seal is formed between the housing 228 and the portion of the backing plate 102 underlying the housing. A seal between the stanchion 230 and the housing 228 is formed by the previously mentioned washer 240. The overall seal thus provided for the subassembly 106 protects the electrical elements therein and the coacting electrical contacts against moisture and prevents harmful exchange of air between the interior spaces of the subassembly and the outside atmosphere upon heating and cooling of the electrical parts.

In a manner similar to that just described, the edge of the smaller subassembly housing 270 engages the sealing layer 276 to form an effective seal for the subassembly 104 and the circuitry means 100 underlying this subassembly.

In like manner the peripheral bead 300 surrounding the contact face 290 of the connecting block 108 is pressed against the sealing layer 316 to form a seal with the underlying portion of the circuitry means 100.

Figure 36:
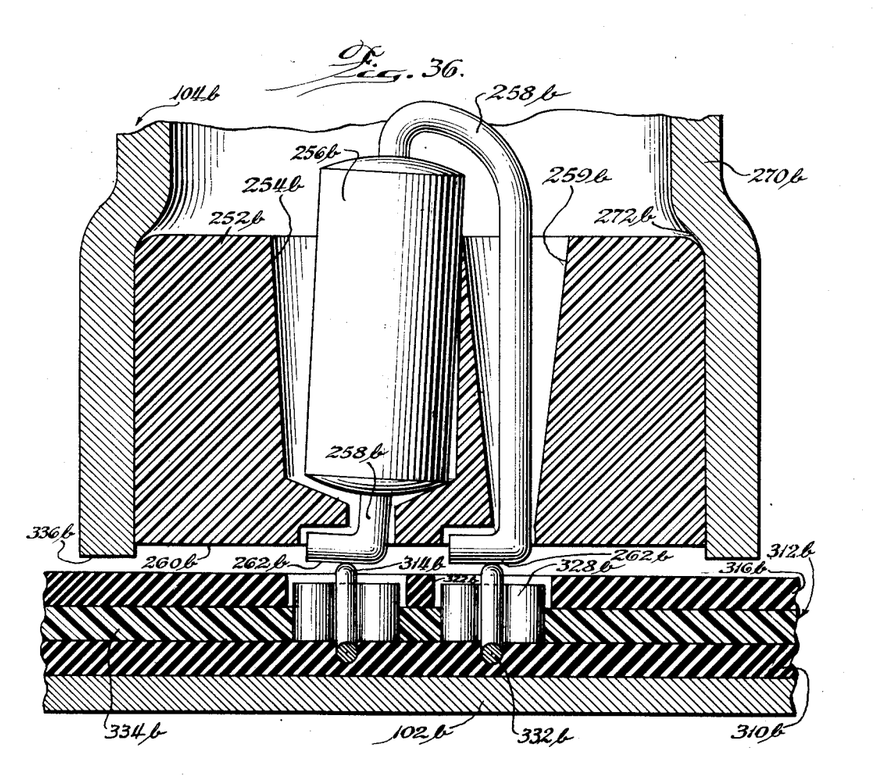
Fig. 36 is a fragmentary vertical sectional view on an enlarged scale of a simplified subassembly and coacting circuitry means, showing the parts before being fully clamped together.
Figures 37, 38, 40, 41:
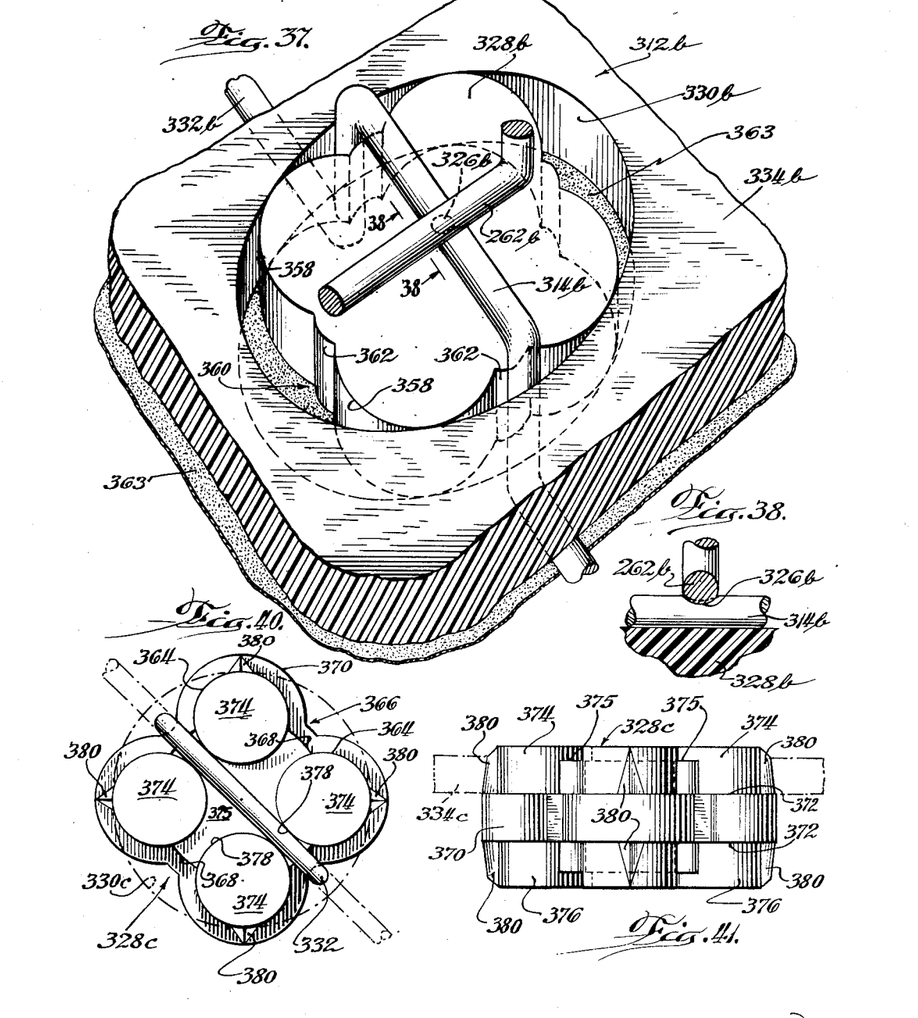
Fig. 37 is a magnified perspective view showing the connection between a contact and a conductor supported by a pellet of modified form.
Fig. 38 is a fragmentary sectional view taken along the line 38—38 of Fig. 37.
Fig. 40 is a plan view on a greatly enlarged scale showing a conductor extending over a support pellet of modified construction.
Fig. 41 is a side view of the pellet of Fig. 40 looking along a diagonal of the pellet.

The circuitry means 100 forms highly efficient electrical connections with the electrical contacts of the subassemblies 104 and 106 and the connecting block 108 which can be more clearly visualized with reference to the simplified illustration of Figs. 36 to 38. In these figures, structural elements forming counterparts of similar components of the circuitry means 100 and the smaller subassembly 104 are indicated with the same reference numerals with the addition of the letter "b."

For simplicity in illustration, Fig. 36 shows the position of the parts in partially exploded relation to each other. It will be noted that the conductor 258b from the outer end of the electrical element 256b extends through a separate opening 259b in the member 252b to the contact face 260b. A highly efficient electrical connection between contacts 262b on the locating member 252b and the circuit board contacts 314b is obtained by engaging the contacts with sufficient unit pressure over the engaged surfaces to break the surfaces and form a sealed area 326b of intimate contact therebetween (see Fig. 37).

Contact pressures of the desired intensity are obtained by using sharply curving contact surfaces in crossed relationship to each other and pressing the contact surfaces hard together by yieldable support means acting through hard support pellets 328b to maintain the high contact pressures at all times in service.

As shown in Figs. 36 and 37, individual support pellets 328b for the respective circuit board contacts 314b are inserted in a pattern of apertures 330b in a thin wafer of insulating material 334b forming a part of the overall circuit board 312b. The various circuit board contacts 314b are formed by small diameter conductor wires 332b running along the underside of the wafer 334b and extending up through the various apertures 330 to run across the pellets 328 therein, re-entering the apertures on the opposite sides of the pellets to continue along the underside of the wafer.

The pellets 328b are formed from ceramic or other suitable hard material capable of forming a hard anvil-like support to the individual circuit board contacts 314b. The underside of the pellets 328b rest on the elastic base 310b as shown in Fig. 36.

Even though the pellets 328b are not large, the base area of each pellet in contact with the elastic base 310b is many times that of the small area of contact 326b created between the overlying circuit board contact 314b and the coacting contact 262b. Hence a pressure intensity between the resilient base 310b and the individual pellets 328b, which is under the value that would fracture the surface of the base, will produce a stepped up pressure intensity over the area of engagement 326b between the coacting contacts, which is sufficient to fracture the contacting surfaces. As a result intimate engagement is obtained between each two coacting contacts 262b and 314b over the entire contact area 326b. Moreover, the coacting contacts are deformed over the area 326b to produce an effective seal around the periphery of the contact area which shuts out corrosive and other factors which would otherwise tend to destroy the efficiency of the electrical connection formed between the coacting contacts (see Fig. 38).

The high pressure intensity over the contacting surface areas 326b of the coacting contacts 262b, 314b is maintained at all times in service by the yieldable action of the resilient base member 310b on the pellets 328b.

It will be appreciated that when the contact face 260b of the locating member 252b is pressed firmly against the sealing layer 316b, by the housing 270b, Fig. 36, the force transmitted through the contacts 262b to the pellets 328b will press the latter down into the resilient base 310b, thus creating the desired elastic reaction of the base on the pellets. Fig. 36 clearly illustrates the slight protrusion of the marginal edge 336b of the assembly housing 270b beyond the contact face 260b to press into the sealing layer 316b to form the previously described seal with the circuitry means 100b.

Turning back now to the overall construction of the circuitry means 100 shown in Figs. 11 and 33 to 35, it will be noted that the wires 332 on the underside of the wafer 334 are arranged in a predetermined pattern (Fig. 34) designed to make the desired interconnection between the various contacts 314 on the upper side of the circuit board 312.

In general, the circuit board 312 is assembled by laying the wires 332 along the lower side of the wafer 334 to extend across the various apertures 330 in the wafer. The pellets 328 are inserted through the apertures 330 from the lower side of the wafer 334, thus carrying portions of the wires 332 through the apertures to form the contacts 314.

Figure 39:
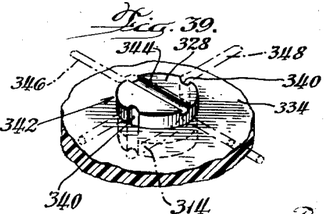
Fig. 39 is an inverted fragmentary view of the circuit board.

A fragmentary perspective view of this construction, as viewed from the lower side of the wafer 334 is shown in Fig. 39. At opposite ends of the contact 314 extending across a pellet 328, the wire forming the pellet extends through grooves 340 in opposite sides of the pellet to the underside of the wafer 334. The grooves 340 maintain the contact 314 in its proper location on the pellet.

In laying out the pattern of wires 332 on the underside of the circuit board wafer 334 it is oftentimes convenient that the wires 332 cross each other at various points. Crossing of the wires 332 one under the other (as indicated by the numerals 342) is facilitated by using the pellets 328 as insulation between the wires. Thus, as shown in the inverted illustration of Fig. 39, a transverse groove 344 is formed on the underside of each pellet 328 in generally perpendicular relation to the contact 314 located on the upper face of the pellet by the two grooves 340. The wire 346 (Fig. 39) to be crossed under another wire 348 is passed under the pellet 328 which supports the contact 314 formed by the overlying wire 348. The crossing groove 344 aids in maintaining the underlying wire 346 in proper position for assuring insulation between the wires by the pellet 328, which is formed of an insulating material.

As indicated in Figs. 11 and 39, the contact support pellets 328 have a thickness somewhat greater than that of the insulating wafer 334 in which the pellets are positioned. Thus the pellets protrude somewhat above and below the wafer 332. The portions of the pellets 328 extending below the wafer 332 pass through the previously mentioned apertures 320 in the auxiliary support wafer 318 to rest on the underlying resilient base 310. This auxiliary support wafer 318, which is not shown in the simplified illustration of Fig. 36, serves as an aid in maintaining the pellets 328 and wires 332 in position.

Figure 34:
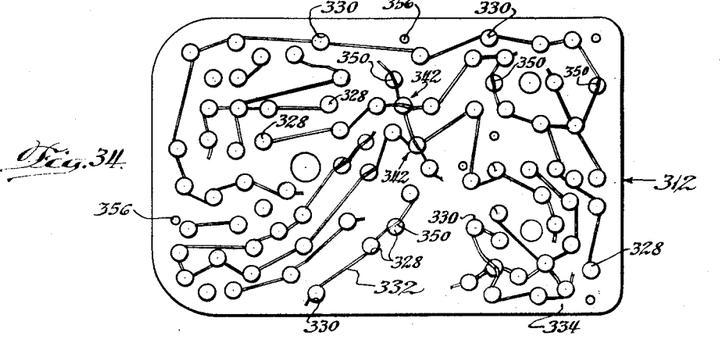
Fig. 34 is a sectional view taken along line 34—34 of Fig. 11 and showing the underside of the circuit board.
Figure 35:
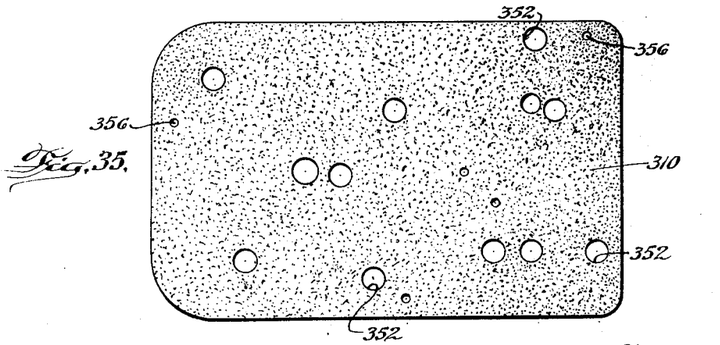
Fig. 35 is a horizontal sectional view taken along line 35—35 of Fig. 11.

Grounding of various ones of the wires 332 is provided for in a very simple way. A wire to be grounded is run along the underside of a pellet 328 in the two wafers 334 and 318, thus forming a downwardly facing contact 350 on the underside of the pellet (Fig. 34). This contact 350 is engaged with the underlying metal backing plate 102 through an aperture 352 in the resilient base 310. If necessary, suitable grounding (not shown) is provided for the backing plate 102.

A number of locating pins 354 in the backing plate 102 extend upwardly through apertures 356 in the base 310, the wafer 318, the wafer 334 and the sealing layer 316 as an aid in positioning these parts on the backing plate.

Referring back now to Fig. 37, the pellet 328b shown in this figure is actually a modification of the pellets 328 illustrated in Figs. 34 and 39, which is better suited in certain respects for manufacture on a mass production basis. The modified pellet 328b is adapted to be punched from stock material. The pellet has a generally square outline as viewed from above. The four corners 358 of the pellet are rounded inwardly into the four sides of the pellet, thus forming four indentations 360 in the respective sides of the pellet extending between the flat upper and lower faces of the pellet. A short convex surface 362 in the bottom of each indentation 360 merges with the curved surfaces of the two adjacent corners 358. Any two of the indentations 360 on opposite sides of the pellet 328b form side guides for receiving the wire 332b as it passes downwardly through the aperture 330b from opposite ends of the conductor 314b extending across the upper face of the pellet. The curving surfaces of the four corners 358 facilitate sliding of the wire 332b into the guiding indentations 360. After insertion into the wafer aperture 330b, the pellets 328b may be held in place for handling purposes by placing a thin sheet of adhesive material 363 or the like on the underside of the wafer 334b to adhere to both the wafer and the pellets.

Another modified form 328c of the support pellets shown in Figs. 40 and 41 has a more intricate shaping. It can be moulded very economically from glass or alkyd. Like the previously described pellet 328b of Fig. 37, the pellet 328c has a generally square outline as viewed from one end. It also has four rounded corners 364 having rounded surfaces extending inwardly into the respective sides of the pellet to short convex surfaces 368 to define four oppositely spaced indentations 366.

A medial belt 370 formed on the periphery of the pellet 328c extends somewhat beyond the main body of the pellet and has a shaping generally similar to that of the main body periphery. The upper and lower sides of the belt 370 form generally flat ledges 372 parallel to the upper and lower faces of the pellet.

Four rounded protuberances 374 extend upwardly a short distance from the upper face 375 of the pellet 328c in spaced relation to each other as continuations of the four corner portions 364 of the pellet body. Four similarly protuberances 376 are formed on the lower side of the pellet body.

The four protuberances on each face of the pellet define two perpendicular guide channels 378 extending across the pellet and having opposite ends aligned with the indentations 366 in the pellet sides. As indicated in Fig. 40, the indentations 366 and guide channels 378 are well adapted to locate a circuit wire 332 that extends upwardly along one of the indentations 366 to pass across the pellet 328c through one of the guide channels 378 and down through an indentation 366 on the opposite side of the pellet. Similar guide channels 378 formed on the lower side of the pellet 328c can be used to locate another conductor wire (not shown) which crosses beneath the pellet.

The belt 370 on the pellet 328c serves to stabilize the pellet after it has been inserted upwardly into an aperture 330c in a wafer 334c (both indicated in phantom in Figs. 40 and 41) by resting against the underside of the wafer. Four triangular protuberances 380 extend upwardly and downwardly from each belt ledge 372, at the four corners of the pellet 328c. The four protuberances on the upper side of the belt 370 dig into the wafer 334c forming a seal therewith.

A useful modification of the circuitry means used to interconnect electrical elements is shown in Figs. 42 and 43. The circular metal backing plate 382 is equipped with a number of downwardly extending prongs 384, some of which are insulated from the plate and shaped to form contacts 386 in the upper face of the plate. A peripheral flange 388 on the circular plate 382 is turned upwardly to embrace the edges of a plurality of discs stacked on the backing plate and positioned in relation to each other by a number of locating pins 390 extending upwardly from the plate.

These discs include a resilient base 392 formed of rubber or similar material laid directly on the backing plate 382. A plurality of apertures 394 in the base 392 are aligned with the contacts 386 of the prongs 384. The base 392 supports two disc-like circuit boards 396 and 398 laid one on top of the other. Each circuit board 396, 398 is in general similar to the circuit board 312, previously described. Various downwardly facing contacts, not specifically illustrated, on the lower circuit board 396 engage the prong contacts 386 through the base apertures 394.

The upper circuit board 398 has a pattern of contacts and pellets 400 fitted into apertures in the board and connected by circuit wires on the underside of the circuit board. A pattern of additional apertures 402 in the upper circuit board 398 permit the passage therethrough of contacts and pellets 404 protruding upwardly from the lower circuit board 396. The contacts of the lower circuit board are interconnected by wires on the underside of this board.

Thus the total pattern of contacts presented at the upper surface of the top circuit board 398 includes both the contacts and pellets 400 on the upper circuit board and contacts and pellets 404 on the lower circuit board. This expedient of mounting the contact structure on two circuit boards simplifies the matter of laying out the wires on each circuit board. A circular sealing layer of rubber or similar material 406 laid on the upper circuit board 398 has a plurality of apertures 408 exposing the underlying contact and pellet structure 400, 404 of both circuit boards 396, 398.

In the following claims the wording "electronic components" denotes structural parts characterized by an inherent structural and functional capacity to provide upon installation in an electronic circuit an influence upon operation of the circuit marked primarily by an electronic characteristic, such as capacitance, inductance, resistance, or electronic valving, as distinguished from the electrical characteristics of a simple conductor.

While I have shown and described preferred embodiments of my invention, it will be apparent that variations and modifications thereof may be made without departing from the principles and scope of the invention. I therefore desire, by the following claims, to include all such variations and modifications by which substantially the results of my invention may be obtained through the use of substantially the same or equivalent means.

I claim:

1. In electronic apparatus, the combination of a resilient support base, a plurality of hard pellets arranged in a predetermined pattern on the base, a plurality of conductor wires of relatively small transverse section extending across the respective pellets, a locating member, a plurality of electrical elements mounted on one side of the locating member, a plurality of contacts on the side of the locating member opposite from the electrical elements and connected electrically with the elements, the respective contacts presenting generally convex contact surfaces having short radii of curvature, the contacts being arranged in a pattern correlated with that of the pellets, and means for pressing the locating member contacts firmly into engagement with portions of the conductor wires resting on the pellets to create high unit pressure engagement therebetween sustained by the force of the resilient support base on the pellets.

2. In electronic apparatus, an efficient corrosion resistant contact assembly comprising, in combination, a resilient support base, a hard pellet resting on the base, a metallic wire of rather small diameter extending across the pellet, a contact presenting a convex surface of sharp curvature opposing the wire on the pellet and disposed at a sharp angle therewith, and means for forcing the contact against the portion of the wire resting on the pellet to make a high unit pressure contact therewith breaking the surface of at least one of the contacting elements to establish an efficient electrical connection therebetween, the pressure engagement between the contact and wire being maintained by force of the resilient base on the pellet.

3. A sealed circuitry assembly for electronic apparatus comprising, in combination, a backing member, a resilient base supported on the backing member, circuitry including a pattern of contacts supported by the resilient base and defining a plurality of contact surfaces facing away from said base in substantially tangential relation to a plane parallel to said base, a flat resilient sealing member overlying the circuitry, a plurality of apertures formed in the sealing member in alignment with underlying contacts of the circuitry, a locating member forming a generally flat contact face, a pattern of contacts on said locating member aligned with the apertures in the sealing member, said locating member contacts defining contact surfaces facing said circuitry contacts and disposed in generally tangential relation to a plane parallel to said locating member, means for applying force to the locating member to hold the contact face thereof in tight engagement with the sealing member making contact through the sealing member apertures between contacts on the locating member and the contacts of the circuitry, and means forming a sealing edge encircling the contact face of the locating member and offset therefrom toward the sealing member to form an effective seal therewith.

4. An electrical assembly comprising, in combination, generally flat circuitry means, a layer of resilient sealing material overlying the circuitry means, a subassembly of electrical elements disposed adjacent the circuitry means, housing means encasing the subassembly and including an extended edge portion engageable with the sealing layer to form an effective seal between the subassembly and the opposed portion of the circuitry means, a connecting block disposed adjacent the circuitry means in a position removed laterally from the elements, a plurality of conductor wires extending through the block and sealed thereto, means projecting from the block into engagement with the sealing layer to form an effective seal between the block and the opposed portion of the circuitry assembly, and means forming electrical interconnections between the circuitry assembly and the electrical elements of the subassembly and the conductor wires in the block.

5. In electronic apparatus, the combination of circuitry means including a plurality of relatively small cross-section wires, portions of which are displaced outwardly to define a generally flat pattern of contacts, a resilient mounting means for the pattern of contacts, a member of considerable thickness forming a contact face thereon, the side of the member opposite from the contact face forming a plurality of sockets therein, electrical elements mounted in the respective sockets, relatively small cross-section wire connecting leads on the elements extending through the member to define a plurality of contacts disposed on the contact face in a predetermined pattern, the member forming a peripheral ledge thereon, a housing coacting with the member to encase the electrical elements, the housing forming a peripheral shoulder engageable with the ledge to exert a force on the member pressing contacts thereon into engagement with the contacts of the circuitry means to fracture the surface of at least one of each pair of engaging contacts to establish an efficient electrical connection therebetween, the pressure engagement between the contacts being maintained by the force of the resilient mounting means.

6. An assembly of electronic apparatus comprising, in combination, a circuitry assembly, a locating member defining a contact face thereon opposing the circuitry assembly, a plurality of electrical elements clustered on the locating member and having integral lead wires extending through the latter to define contacts in the contact face thereon, a housing coacting with the locating member to encase the electrical elements, and means on the housing providing support to the individual electrical elements to maintain the contacts thereof in the contact face of the locating member to engage coacting structure of the circuitry assembly.

7. In electronic apparatus, the combination of a member defining a contact face on one side thereof and a socket extending therethrough in generally perpendicular relation to the contact face, the end of the socket remote from the contact face being enlarged to form an internal ledge in the socket facing away from the contact face, the socket having a noncircular transverse shaping, an insulating insert shaped to fit into the socket, an elongated electrical element mounted on one end of the insert opposite from the contact fact in generally perpendicular relation to the latter, a peripheral projection on the medial portion of the insert adapted to engage the socket ledge, a hollow jacket fitted over the electrical element and engaging the side of the insert projection opposite from the socket ledge to hold the insert firmly in the socket, and conductors extending from the electrical element through the insert and forming spaced contacts on one end thereof located generally in the plane of said contact face.

8. In an assembly of electronic apparatus, the combination of a circuitry assembly, a locating member disposed adjacent the circuitry assembly in opposed relation to a portion thereof, the locating member including a recessed portion defining a socket therein and an internal ledge facing the circuitry assembly, an electrical element disposed in the socket, an insulating insert engageable with the ledge, lead wires on the electrical element extending through the insert toward the circuitry assembly to define contacts on the circuitry assembly side of the insert, and contacts in the circuitry assembly engageable with the insert contacts.

9. In an assembly of electronic apparatus, the combination of a circuitry assembly, a locating member disposed in opposed relation to a portion of the circuitry assembly, the locating member defining a socket therein opening toward the circuitry assembly, an electrical element disposed in the socket, an insulating support engageable with the locating member to be held firmly against the circuitry assembly, electrical lead wires on the electrical element extending through the insulating support and defining contacts on the circuitry assembly side thereof, and contacts in the circuitry assembly engageable with the electrical element contacts.

10. In an assembly of electronic apparatus, the combination of a circuitry assembly, a locating member disposed in opposed relation to a portion of the circuitry assembly, an electrical element mounted on the locating member, a pair of conductor wires extending from the electrical element toward the circuitry assembly, an insulating support for the conductor wires supported by the locating member, the conductor wires being flattened on the circuitry assembly side of the insulating support to form narrow contacts, and contacts in the circuitry assembly engageable with the conductor wire contacts.

11. In electronic apparatus, the combination of a member defining a generally flat contact face thereon and forming a recess in the contact face, a socket opening into the member from the bottom of the recess, the socket being smaller in transverse section than the corresponding section of the recess, an elongated electrical element adapted to fit into the socket, the electrical element having a plurality of conductors extending to one end thereof, an insert shaped and dimensioned to fit snugly in the recess, the conductors extending through the insert and defining contacts on the side thereof opposite from the electrical element, and the contacts being shaped to resist movement through the insert in the direction of the electrical element whereby the contacts are held firmly in the contact face of the member by bottoming of the insert in the recess.

12. In electronic apparatus, the combination of a member forming a contact face thereon and a recess in the face, a socket extending inwardly into the member from the bottom of the recess in generally perpendicular relation to the contact face, an elongated electrical element insertable into the socket, means forming an enlargement on the contact face end of the electrical element shaped to fit into the recess, electrical conductors extending from the electrical element through the enlargement, and the conductors being cut off and flattened beyond the enlargement to form electrical contacts adjacent the contact face which are held against movement through the enlargement in the direction of the electrical element.

13. In electrical apparatus, the combination of circuitry including a plurality of contacts arranged in a generally flat pattern, a connecting block defining a generally flat contact face adapted to oppose a portion of the circuitry pattern of contacts, resilient sealing means surrounding the coacting portion of the circuitry, a raised bead on the block surrounding the contact face thereof, a plurality of conductors extending through the block and forming contacts on the contact face thereof for engagement with the circuitry contacts, the block being formed in at least two parts for separation along a plane generally parallel to the contact face, a layer of resilient sealing material interposed between the two block parts and apertured for the passage of the conductors therethrough, one of the block parts having raised beads formed thereon encircling the conductors extending therethrough and facing the plane of separation of the two block parts, and means for applying compressive force between the block parts and between the block and the resilient sealing means surrounding the opposed portion of the circuitry to form effective seals between the block and the conductors and between the block and the circuitry means.

14. A contact assembly for electronic apparatus comprising, in combination, a hard support member, a cylindrical conductor of small diameter laid across the support member, a second cylindrical conductor of small diameter laid across the first conductor in contact therewith and in generally perpendicular relation thereto, a resilient member supporting the support member, and means for applying force to the second conductor to press the latter into engagement with the first conductor creating high unit pressure contact therebetween sufficient to break the surface of at least one of the conductors to seal off a small area of contact therebetween from corrosive influences, the resilient member thus exerting a compressive force on the hard support member to maintain the high unit pressure between the contacting conductors.

15. A circuitry support pellet for electronic apparatus, comprising, a body of hard insulating material forming support faces on opposite ends thereof, the body having four corner portions between the faces rounded inwardly toward each other, and the portions of the body between the rounded corners being offset inwardly of the corners to define guides between the two faces.

16. A circuitry support pellet for electronic apparatus comprising, in combination, a body of hard insulating material forming two end faces thereon, a peripheral belt integral with the body and extending outwardly therefrom between the two end faces thereon, the belt being considerably thinner than the body and forming ledges on opposite sides thereof, a plurality of protuberances on the ledges, and means on at least one of the body end faces forming a conductor guide extending thereacross.

17. For use in electronic apparatus, a contact support, a pellet of hard insulating material having two faces on opposite ends thereof, one of the end faces being shaped to form a contact guide channel extending thereacross to receive a conductor, opposite sides of the pellet forming guides therein aligned with opposite ends of the guide channel, and the other end face of the pellet being shaped to form a cross-over guide channel therein generally perpendicular to the contact guide channel.

18. A support pellet for circuitry of electronic apparatus, comprising, in combination, a body of hard material having two opposite ends, a plurality of spaced protuberances on one end of the body defining a contact guide therebetween, opposite sides of the body being shaped to form side guides extending from opposite ends of the contact guide to the opposite face of the body.

19. A circuitry support pellet for electronic apparatus, comprising, a body of hard insulating material forming two opposite end faces thereon, a medial belt of substantially less thickness than the body projecting outwardly from the periphery thereof between the two end faces thereon, means forming a conductor guide channel on one end of the body and opposite sides of the pellet forming side guides aligned with opposite ends of the conductor guide channel.

20. A circuitry support pellet for electronic apparatus, comprising, in combination, a body of material forming two end faces thereon, four rectangularly spaced protuberances on each end face forming conductor guide channels therebetween, the body forming four rounded corners between the end faces and defining side guides therebetween extending generally between corresponding ends of guide channels on the opposite end faces, and a medial belt of substantially less thickness than the body integral therewith and extending outwardly therefrom around the periphery thereof between the two end faces.

21. In electronic apparatus, a circuitry assembly comprising, in combination, a pair of circuit boards laid one over the other; the lower circuit board including an insulating wafer defining a pattern of apertures therein, a plurality of support pellets inserted in the respective apertures and having a thickness greater than that of the wafer, and a plurality of circuit wires extending across the upper portion of the support pellets to define electrical contacts thereon; the upper circuit board including an insulating wafer defining a pattern of apertures therein, a plurality of support pellets inserted in the apertures of the upper wafer, and a plurality of circuit wires extending across the upper portion of the last mentioned support pellets to form contacts thereon; the upper wafer defining a pattern of additional apertures therein conforming generally to the pattern of apertures in the lower wafer to receive the support pellets extending upwardly from the lower wafer, and means providing support for both circuit boards superimposed one on the other.

22. A circuitry assembly comprising, in combination, a pair of circuit boards superimposed one on the other, each of the circuit boards including an insulating wafer defining a pattern of apertures therein, a plurality of support pellets inserted in apertures of each wafer, conductors extending across the support pellets to form electrical contacts thereon, and support pellets of one wafer extending through apertures in the other wafer to support contacts in substantially coplanar relation with contacts supported by pellets in the other wafer.

23. An electronic assembly comprising, in combination, a support panel, a circuit board supported on said panel and including a plurality of contacts thereon located and interconnected in a predetermined pattern, said contacts defining contact surfaces facing away from said panel in substantially tangential relation to a plane generally parallel to said circuit board; at least one electronic subassembly mounted in assembled relation to said circuit board and including a locating board substantially parallel to said circuit board, a plurality of electronic components clustered on the side of said locating board opposite said circuit board, and a plurality of at least two conductors connected to each of said components and extending through said circuit board, said conductors forming a pattern of electrical contacts on the side of said locating board opposite said components, said locating board contacts opposing said respective circuit board contacts and defining contact surfaces facing away from the locating board in tangent relation to a plane substantially parallel thereto for engagement with said circuit board contact surfaces substantially coplanar to said locating board contact surfaces; a plurality of support jackets surrounding said respective electronic components, and means providing support to said jackets and applying force through said locating board perpendicular to the plane thereof to said contacts thereon to hold the latter in engagement with said circuit board contacts by forces substantially perpendicular to said circuit board and locating board.

24. An electronic assembly comprising, in combination, a support panel, a backup layer of resilient material on said panel, a circuit board supported on said backup layer and having thereon a pattern of interconnected electrical contacts, said contacts defining contact surfaces facing away from said resilient layer in substantially tangential relation to a plane generally parallel to said circuit board, a subassembly locating board; a plurality of electronic components including, for example, resistors, capacitors, inductors, and the like clustered on the side of the locating board opposite from said circuit board; a plurality of at least two conductors connected to each of said respective components and extending through said locating board, said conductors forming on the side of said locating board opposite said components a pattern of contacts opposing said circuit board contacts, said locating board contacts defining contact surfaces facing away from the locating board in tangential relation to a plane substantially parallel thereto, and means for applying force to said locating board contacts through said locating board in perpendicular relation thereto to hold the opposing surfaces of said locating board contacts and said circuit board contacts in engagement by forces perpendicular to said locating board and said circuit board.

25. An electronic assembly comprising, in combination, a generally flat circuit board having a plurality of electrical contacts thereon located and interconnected in a predetermined pattern, means including a support panel for supporting said circuit board from one side, said circuit board contacts facing away from said support panel in tangential relation at the outer extremities thereof to a plane generally parallel to the circuit board, at least one subassembly of electronic components mounted in coacting relation to said circuit board and including a locating board, a plurality of electronic components clustered on the side of said locating board opposite from said circuit board, a plurality of at least two electrical conductors connected to each of said electronic components and extending through said locating board, said conductors forming on the side of said locating board opposite said components a pattern of electrical contacts opposing said respective circuit board contacts, said locating board contacts facing away from the locating board in substantially tangential relation to a plane generally parallel to the locating board, and means applying force to said locating board contacts through said locating board in generally perpendicular relation thereto to hold the opposing surfaces of said locating board contacts and said circuit board contacts in engagement by forces perpendicular to said locating board and said circuit board.

26. An electronic assembly comprising, in combination, a support panel, a backup layer of resistant material on one side of said support panel, a circuit board resting against the side of said backup layer remote from said support panel, said circuit board defining a first series of electrical contacts on the side thereof facing said support panel and a second series of contacts on the side thereof facing away from said support panel, said backup layer defining apertures therein aligned with said first series of contacts, conductor means interconnecting various ones of said first and second series of circuit board contacts, a plurality of conductors mounted on said support panel in alignment with said respective circuit board contacts of said first series for engagement with the latter through said support panel apertures, said last mentioned conductors being adapted for connection with separate electrical apparatus, said second series of circuit board contacts defining contact surfaces facing away from said support panel in tangential relationship to a plane generally parallel to said circuit board, means providing support to said first series of circuit board contacts for use in pressing the latter firmly against said conductors last mentioned, said second series of circuit board contacts defining contact surfaces facing away from said support panel in substantially tangential relation to a plane generally parallel to said circuit board, at least one subassembly of electronic components mounted for coaction with said circuit board and including a locating board, a plurality of electronic components clustered on the side of said locating board opposite from said circuit board, a plurality of at least two conductors connected to each of said electronic components and extending through said locating board, said last mentioned conductors forming on the side of said locating board opposite from said components a pattern of electrical contacts opposing said second series of circuit board contacts, said locating board contacts defining contact surfaces facing said circuit board in substantially tangential relation to a plane generally parallel to said locating board, and means applying force to said locating board contacts through said circuit board in generally perpendicular relation thereto to hold said locating board contacts in engagement with said second series of circuit board contacts by forces generally perpendicular to said locating board and said circuit board.

27. In an assembly of electronic apparatus, the combination of a locating board, a plurality of electronic components clustered on one side of said locating board, a plurality of at least two electrical leads extending from each of said components through said locating board and clinched to the opposite side thereof to form a pattern of electrical contacts, said contacts facing away from said locating board in tangential relation to a plane generally parallel to the locating board, a plurality of substantially parallel tubular members surrounding said respective components in perpendicular abutting relation to said locating board, a generally flat circuit board, a pattern of interconnected contacts on said circuit board defining contact surfaces opposing said locating board contacts and facing toward said locating board in substantially tangential relation to a plane generally parallel to said circuit board, and means engaging the ends of said tubular members remote from said locating board for applying force through said locating board in generally perpendicular relation to the plane thereof to engage said locating board contacts with said circuit board contacts by forces generally perpendicular to said locating board and said circuit board.

28. An assembly of electronic apparatus comprising, in combination, a support panel, a layer of resilient material on one side of said panel, a circuit board supported on the side of said resilient layer opposite said panel and having a plurality of contacts thereon located and interconnected in a predetermined pattern, said contacts defining contact surfaces facing away from said resilient layer in generally tangential relation to a plane parallel to said circuit board; at least one subassembly of electronic components mounted for interconnection with said circuit board and including a locating board, a plurality of electronic components clustered on the side of said locating board opposite from said circuit board, and a plurality of at least two conductors connected with each component and forming on the opposite side of said locating board a pattern of contacts opposing said circuit board contacts, said locating board contacts defining contact surfaces facing away from the locating board in generally tangential relation to a plane substantially parallel to said locating board; means holding said locating board against said circuit board to engage the locating board contact surfaces with said circuit board contact surfaces, a plurality of backup members underlying said respective circuit board contacts to effect firm engagement of the contact surfaces of the latter with said locating board contact surfaces by forces generally perpendicular to said locating board and said circuit board, and sealing gasket means forming a tight seal between the adjacent peripheral edges of said locating board and said circuit board.

29. An assembly of electronic components comprising, in combination, a support panel, a generally flat resilient element supported on one side of said panel, a circuit board supported on said resilient element and including a sheet of flexible dielectric material, a conductor stitched into said sheet and defining a plurality of interconnected contacts thereon, said contacts defining contact surfaces facing away from said sheet in generally tangential relation to a plane parallel to said sheet; at least one electrical subassembly of electronic components including a locating board, a plurality of electronic components clustered on the side of said locating board opposite from said circuit board, a plurality of at least two conductors connected to each of said components and defining a pattern of electrical conductors on the opposite side of said locating board opposing said respective circuit board contacts, said locating board contacts facing away from said locating board in generally tangential relation to a plane parallel to said locating board; and means for mounting said subassembly in assembled relation to said circuit board to engage said locating board contacts with said circuit board contacts.

30. A sealed circuitry assembly for electronic apparatus comprising in combination a backing member, a resilient base supported on the backing member, circuitry including a pattern of contacts supported by the resilient base, a flat resilient sealing member overlying the circuitry and including aperture means exposing at least the contacts, a locating member forming a generally flat contact face, a pattern of contacts on the locating member aligned with and facing the first-mentioned contacts, means forcing the locating member and backing member toward each other to hold the aligned contacts in tight engagement with each other, and locating member structure encircling the contact face and engaging the sealing member to form an effective seal therewith.

31. A sealed circuitry assembly for electronic apparatus comprising in combination a backing member, a resilient base supported on the backing member, circuitry including a pattern of contacts supported by the resilient base and defining a plurality of contact surfaces facing away from the base in substantially tangential relation to a plane parallel to the base, a flat resilient sealing member overlying the circuitary and including aperture means exposing at least the contact surfaces, a locating member forming a generally flat contact face, a pattern of contacts on the located member defining contact surfaces aligned with and facing the first-mentioned contact surfaces and disposed in generally tangential relation to a plane parallel to the locating member, means forcing the locating member and backing member toward each other to hold the aligned contact surfaces in tight engagement with each other, and locating member structure encircling the contact face and engaging the sealing member to form an effective seal therewith.

32. A sealed circuitry assembly for electronic apparatus comprising in combination a backing member, a resilient base supported on the backing member, circuitry including a pattern of contacts supported by the resilient base, a flat resilient sealing member overlying the circuitry and including aperture means exposing at least the contacts, a locating member forming a generally flat contact face, electronic components carried on one side of the locating member, a pattern of contacts on the other side of the locating member connected to the components and aligned with and facing the first-mentioned contacts, the circuitry forming electrical inter-connections between the components, a housing open at one end receiving the electronic components and co-acting with the locating member to enclose the components, means forcing the locating member and the housing toward the backing member and into engagement with the sealing member to hold the aligned contacts in tight engagement with each other and to form an effective seal.

33. A sealed circuitry assembly for electronic apparatus comprising in combination a backing member, a resilient base supported on the backing member, circuitry including a pattern of contacts supported by the resilient base and defining a plurality of contact surfaces facing away from the base in substantially tangential relation to a plane parallel to the base, a flat resilient sealing member overlying the circuitry and including aperture means exposing at least the contact surfaces, a locating member forming a generally flat contact face, a pattern of contacts on the locating member defining contact surfaces aligned with and facing the first-mentioned contact surfaces, disposed in generally tangential relation to a plane parallel to the locating member, and disposed at a sharp angle with the corresponding aligned circuitry contacts, means forcing the locating member and backing member toward each other to provide high point contact pressure at the engaging contact surfaces to fracture and deform the engaging surfaces to provide a sealed contact area, the resilient base and sealing member holding the aligned contact surfaces in tight engagement with each other, and locating member structure encircling the contact face engaging the sealing member to form an effective seal therewith.

34. The combination claimed in claim 33 together with a plurality of hard pellets interposed between the resilient base and locating member in positions aligned with the aligned contact surfaces to apply high contact pressures to the surfaces.

35. For use in electronic apparatus, a circuit board comprising, in combination, a generally flat insulating wafer defining a pattern of apertures therein, a plurality of support pellets inserted in the respective apertures, a plurality of circuit wires of a relatively small cross-section disposed adjacent one side of the wafer and lying in a plurality of directions, certain of the wires extending through various ones of the apertures alongside the pellets therein to run across the pellets on the opposite side of the wafer and return through the respective apertures to the one side of the wafer to make external circuit connections and to avoid internal circuit connections at crossover points with other wires, certain of the wires extending across the pellets on the one side of the wafer to make external circuit connections on said one side thereby to provide complex electrical circuit connections.

References Cited in the file of this patent

UNITED STATES PATENTS

| 220,936 | McTighe | Oct. 29, 1879 |
| 546,471 | Neher | Sept. 17, 1895 |
| 1,688,976 | Lum | Oct. 23, 1928 |
| 2,027,743 | Merkel | Jan. 14, 1936 |
| 2,041,589 | Bowers | May 19, 1936 |
| 2,066,511 | Arlt | Jan. 5, 1937 |
| 2,114,017 | Dring | Apr. 12, 1938 |
| 2,175,025 | Hooven | Oct. 3, 1939 |
| 2,198,465 | Stokes | Apr. 23, 1940 |
| 2,219,327 | Miller | Oct. 29, 1940 |
| 2,314,225 | Leece | Mar. 16, 1943 |
| 2,417,552 | Ilker | Mar. 18, 1947 |
| 2,439,326 | Wilson | Apr. 6, 1948 |
| 2,439,412 | Mitchell | Apr. 13, 1948 |
| 2,441,960 | Eisler | May 25, 1948 |
| 2,445,719 | Sylvester | July 20, 1948 |
| 2,462,489 | Hallett | Feb. 22, 1949 |
| 2,478,274 | Johnson | Aug. 9, 1949 |
| 2,478,632 | Lockwood et al. | Aug. 9, 1949 |
| 2,483,551 | Libman | Oct. 4, 1949 |
| 2,485,241 | Lang | Oct. 18, 1949 |
| 2,499,589 | Kennedy | Mar. 7, 1950 |
| 2,518,464 | Guillmin | Aug. 15, 1950 |
| 2,547,002 | Leno | Apr. 3, 1951 |
| 2,581,967 | Mitchell | Jan. 8, 1952 |
| 2,651,007 | Shepard | Sept. 1, 1953 |
| 2,710,384 | Dupre | June 7, 1955 |
| 2,748,321 | Kamm | May 29, 1956 |

FOREIGN PATENTS

| 236,261 | Great Britain | June 29, 1925 |